(12) United States Patent
Rodden et al.

(10) Patent No.: US 7,980,436 B2
(45) Date of Patent: Jul. 19, 2011

(54) CARGO BOX GEAR MOUNTING ASSEMBLY

(75) Inventors: Steve Rodden, Sherwood, OR (US); Jeff Castro, Portland, OR (US)

(73) Assignee: Yakima Products, Inc., Beaverton, OR (US)

(*) Notice: Subject to any disclaimer, the term of this patent is extended or adjusted under 35 U.S.C. 154(b) by 1282 days.

(21) Appl. No.: 11/479,153

(22) Filed: Jun. 30, 2006

(65) Prior Publication Data

US 2007/0114256 A1 May 24, 2007

Related U.S. Application Data

(60) Provisional application No. 60/695,977, filed on Jul. 1, 2005.

(51) Int. Cl.
*B60R 9/00* (2006.01)
*B60R 9/048* (2006.01)

(52) U.S. Cl. ........ 224/310; 224/324; 224/328; 224/321; 224/309

(58) Field of Classification Search .......... 224/328, 224/324, 310, 319, 321, 309, 315, 317, 282, 224/325; 414/462
See application file for complete search history.

(56) References Cited

U.S. PATENT DOCUMENTS

| | | | |
|---|---|---|---|
| 1,313,687 A | 8/1919 | Hellweg | |
| 2,483,947 A | 10/1949 | Turner | |
| 2,547,083 A * | 4/1951 | Lundgren | 414/463 |
| 2,964,166 A * | 12/1960 | Lehner et al. | 206/579 |
| 3,008,177 A | 11/1961 | Wooten, Jr. | |
| 3,113,819 A * | 12/1963 | Bessette | 312/323 |
| 3,677,196 A | 7/1972 | Schuller | |
| 3,715,044 A * | 2/1973 | Simons | 414/462 |
| 4,039,096 A * | 8/1977 | McAllister | 414/462 |
| 4,084,735 A * | 4/1978 | Kappas | 224/328 |
| 4,217,999 A | 8/1980 | Forsman | |
| 4,225,069 A * | 9/1980 | Breitschwerdt et al. | 224/328 |
| 4,234,112 A * | 11/1980 | Gallant | 224/559 |
| 4,249,684 A | 2/1981 | Miller et al. | |
| 4,274,568 A | 6/1981 | Bott | |
| 4,378,898 A | 4/1983 | Smeenge et al. | |
| 4,406,387 A | 9/1983 | Rasor | |
| 4,420,105 A | 12/1983 | Nepper | |
| D297,629 S | 9/1988 | Breger | |
| D297,630 S | 9/1988 | Breger | |
| D297,631 S | 9/1988 | Breger | |
| 5,096,107 A * | 3/1992 | VanSon | 224/328 |
| 5,280,848 A | 1/1994 | Moore | |
| 5,348,207 A * | 9/1994 | Frank | 224/310 |
| 5,419,479 A | 5/1995 | Evels et al. | |

(Continued)

FOREIGN PATENT DOCUMENTS

DE 2804588 8/1979

(Continued)

*Primary Examiner* — Justin M Larson
*Assistant Examiner* — Peter Helvey
(74) *Attorney, Agent, or Firm* — Kolisch Hartwell, P.C.

(57) ABSTRACT

A gear mounting assembly for mounting gear within a vehicle rooftop cargo box. The mounting assembly includes a support platform for mounting gear, and which is configured to fit within a vehicle cargo box. The mounting assembly also includes an attachment mechanism for attaching the support platform to the cargo box, configured to allow rotation of the support platform between a stowed position and a rotated position in which gear is "presented" to a user.

17 Claims, 4 Drawing Sheets

U.S. PATENT DOCUMENTS

| | | | |
|---|---|---|---|
| 5,484,092 A * | 1/1996 | Cheney | 224/404 |
| 5,492,258 A | 2/1996 | Brunner | |
| 5,516,019 A * | 5/1996 | Moon | 224/324 |
| 5,546,705 A | 8/1996 | Hirtsiefer | |
| 5,582,313 A | 12/1996 | Envall | |
| 5,582,316 A | 12/1996 | Masayoshi et al. | |
| 5,762,244 A | 6/1998 | Wagner et al. | |
| 5,823,411 A | 10/1998 | Gronwoldt et al. | |
| 5,827,036 A * | 10/1998 | Steffes et al. | 414/462 |
| 5,845,828 A | 12/1998 | Settelmayer | |
| D412,881 S | 8/1999 | Behringer | |
| 5,947,356 A | 9/1999 | Delong | |
| 6,145,719 A | 11/2000 | Robert | |
| 6,273,311 B1 | 8/2001 | Pedrini | |
| 6,296,161 B1 | 10/2001 | Van der Feen et al. | |
| D462,312 S | 9/2002 | Klein | |
| 6,463,627 B1 | 10/2002 | Hirtsiefer | |
| 6,546,598 B1 * | 4/2003 | Nakanou et al. | 224/281 |
| 6,659,318 B2 * | 12/2003 | Newbill | 224/503 |
| 6,681,971 B2 | 1/2004 | Laverack | |
| 6,789,357 B1 | 9/2004 | McCullough | |
| 6,918,521 B2 | 7/2005 | Settelmayer | |
| D515,016 S | 2/2006 | Gruner | |
| D519,914 S | 5/2006 | Klein | |
| D527,337 S | 8/2006 | Klein | |
| D528,498 S | 9/2006 | Gruner | |
| 2002/0030074 A1 | 3/2002 | Bove et al. | |
| 2004/0256427 A1 | 12/2004 | Settelmayer et al. | |
| 2005/0145639 A1 | 7/2005 | Viklund et al. | |

FOREIGN PATENT DOCUMENTS

| | | |
|---|---|---|
| DE | 3837209 | 3/1990 |
| DE | 19526477 | 9/1996 |
| DE | 19742253 | 5/1999 |
| EP | 1231112 A2 | 8/2002 |
| FR | 2840571 | 7/2005 |
| JP | 7-172452 | 7/1995 |
| JP | 8-258630 | 10/1996 |
| JP | 11-291832 | 10/1996 |

* cited by examiner

CARGO BOX GEAR MOUNTING ASSEMBLY

CROSS-REFERENCE TO RELATED APPLICATION

This application is based upon and claims priority under 35 U.S.C. §119 from U.S. Provisional Patent Application Ser. No. 60/695,977 filed Jul. 1, 2005, which is incorporated herein by reference in its entirety for all purposes.

FIELD OF THE INVENTION

The present invention is related to cargo boxes. More specifically, the present invention is related to mounting assemblies for mounting gear within cargo boxes disposed on top of a vehicle.

BACKGROUND

Top-mounted vehicle racks provide a versatile platform for transporting bicycles, skis, snowboards, boats, cargo boxes, gear racks, and other items. In recent years, car top carriers in the form of cargo boxes or trunks have become particularly popular. Such enclosed carriers are preferable over conventional open racks for a variety of reasons. For example, enclosed carriers protect cargo from the elements such as wind, rain, and snow, and enclosed carriers are also more secure from theft or vandalism.

However, some car top cargo boxes have shortcomings which may make them difficult or cumbersome to use. For example, a cargo box may have a relatively deep base structure, making access to the interior of the box to load and unload gear difficult. Furthermore, even when gear is not located deep within the box, reaching the gear within the box may require a user to balance on a portion of the vehicle such as a tire or a doorjamb, or to use an accessory ladder to gain access to some portions of the interior of the box, particularly those furthest from the edge of the vehicle roof.

One attempt to overcome the shortcomings described above uses a gear storage assembly that slides laterally out of the cargo box and towards the edge of the vehicle, providing access to the gear without having to reach across the vehicle roof. However, this method requires that the sliding storage assembly be disposed at or above the lip of the base structure, since the assembly must slide out beyond the lip to be accessed by a user. Therefore, such an assembly is not well suited for use within a box having a deep base structure. Furthermore, it still may be difficult for a user to access distal portions of the gear, since the user must reach across the width of the assembly to do so. Thus, a need exists for a cargo storage device that provides better access to the interior of a cargo box, and which may be suitable for use even with cargo boxes having relatively deep base structures.

SUMMARY OF THE INVENTION

A gear mounting assembly for mounting gear within a vehicle rooftop cargo box is provided. The mounting assembly includes a support platform for mounting gear, and which is configured to fit within a vehicle cargo box. The mounting assembly also includes an attachment mechanism for attaching the support platform to the cargo box, configured to allow rotation of the support platform between a stowed position and a rotated position in which gear is "presented" to a user. A stabilizing mechanism may be provided to stabilize the support platform in one or both of the stowed position and the rotated position, and in some embodiments, a cargo box also may be provided as part of a system including both the cargo box and the gear mounting assembly.

DETAILED DESCRIPTION

Figure 1:
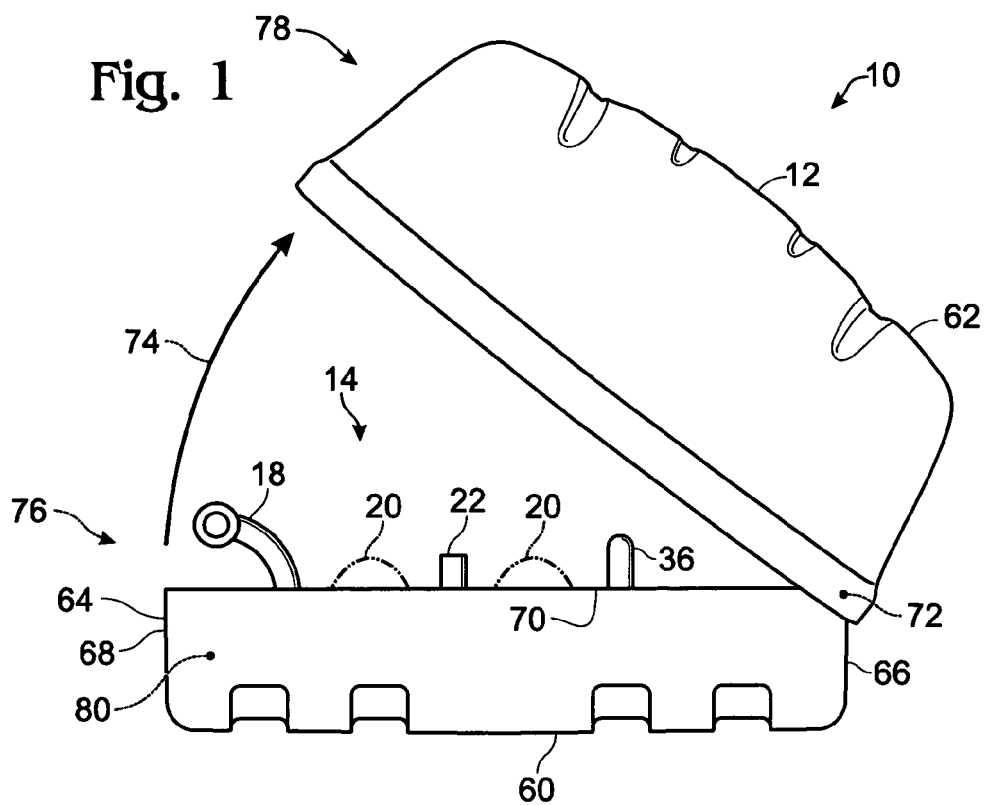
FIG. 1 is side elevational view of a cargo box equipped with a gear mounting assembly according to aspects of the present disclosure, in which the gear mounting assembly is depicted in a stowed position.
Figure 2:
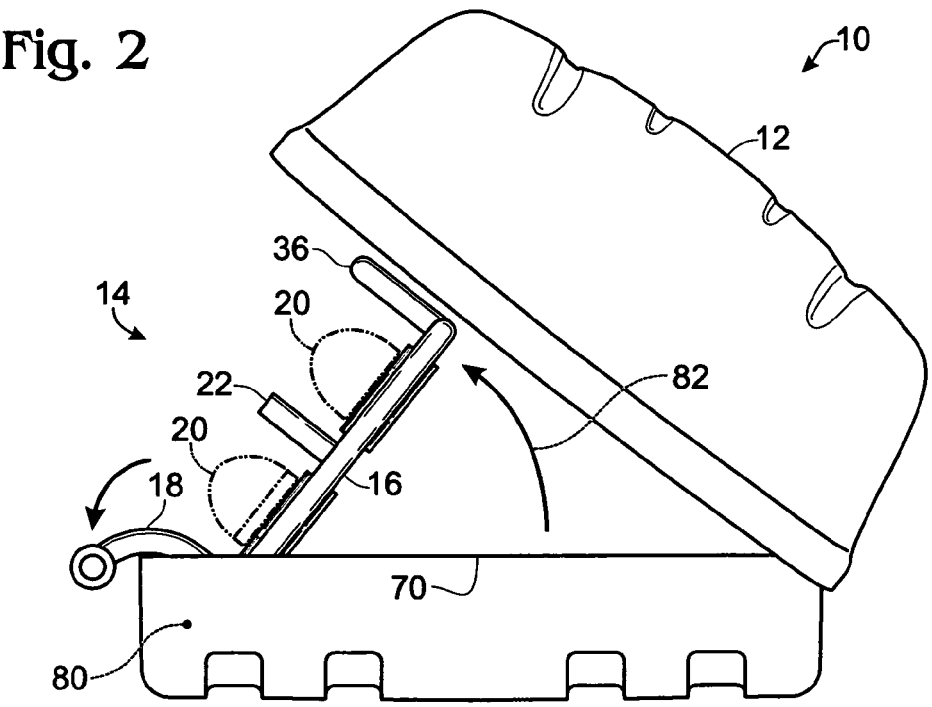
FIG. 2 is another side elevational view of the cargo box and gear mounting assembly of FIG. 1, in which the gear mounting assembly is depicted in a rotated position.

FIGS. 1 and 2 show side elevational views of a vehicle rooftop cargo box gear storage system, generally indicated at 10, including a cargo box 12, and a rotatable (or flip-up) gear mounting assembly 14. The cargo box 12 may include a base structure 60 and a cover structure 62. The base structure 60 may include a sidewall 64 having first and second opposed portions 66, 68 and a circumferential upper lip 70. The cover structure 62 may be pivotably mounted to the base structure 60 and configured to pivot about a first axis 72 in a first rotational direction 74 from a closed position 76 toward an open position 78, as suggested in FIG. 1.

Assembly 14 may be selectively removable from box 12, in a manner to be described below in more detail. As FIGS. 1 and 2 indicate, assembly 14 allows a user to load, unload, and generally gain access to gear stored within the box, by rotating the assembly upward from the plane of the box base, thus "presenting" the gear attached to the assembly to the user. Specifically, FIG. 1 shows gear mounting assembly 14 in a first, or stowed position, substantially parallel to the base plane of box 12, and FIG. 2 shows the assembly in a second position that is substantially rotated with respect to the base plane of the box.

Gear mounting assemblies according to the present disclosure generally include a support platform 16 for mounting gear, an attachment mechanism for attaching the support platform to a cargo box, and a stabilizing mechanism for stabilizing the platform in various positions, such as in its stowed position and/or in its rotated position described above. The attachment mechanism and the stabilizing mechanism are not shown in FIGS. 1 and 2, but will be described in detail below with reference to FIGS. 3-8.

As generally shown in FIGS. 1, 2 and 5-8, the attachment mechanism may be configured to allow selective rotation of the support platform 16 about a second axis 80 parallel to the first axis 72. The support platform 16 may be rotated in a second rotational direction 82 from the first position shown in FIG. 1 toward the second position shown in FIG. 2. As generally suggested in FIGS. 1 and 2, the second rotational direction 82 may be opposite the first rotational direction 74.

Assembly 14 also may include other convenient features, such as a handle 18 for more easily rotating the assembly between its stowed and rotated positions, and one or more retaining straps such as straps 20, which are configured to retain gear mounted to the support platform, and which in various embodiments may be removable and/or adjustable. For example, straps 20 each may be configured to retain a pair of skis, or alternatively, the retaining strap(s) may be removed and replaced with strap(s) configured to retain a snowboard or any other items of gear suitable for storage within the cargo box. In some cases, the retaining straps may be adjustable enough that the same strap or straps may be configured for gear of many different sizes.

The assembly may be configured to allow physical separation of various items of gear mounted to the support platform. For example, if the assembly is configured to carry skis, the support platform may include one or more dividers 22 configured to separate pairs of skis from each other and/or from the sides of the cargo box. Dividers 22 may be movable, so that they can be flipped down and into the plane of the support platform when gear other than skis is mounted to the platform. For example, the divider(s) may be flipped out of the way to accommodate a snowboard or other relatively large item on the platform. Furthermore, although FIGS. 1 and 2 show the assembly configured to mount two pairs of skis, gear mounting assemblies according to the present disclosure also may be used to mount additional pairs of skis (such as 3 or 4 pairs), various numbers of snowboards, or any other types of gear suitable for storage in a vehicle rooftop cargo box.

Figure 3:
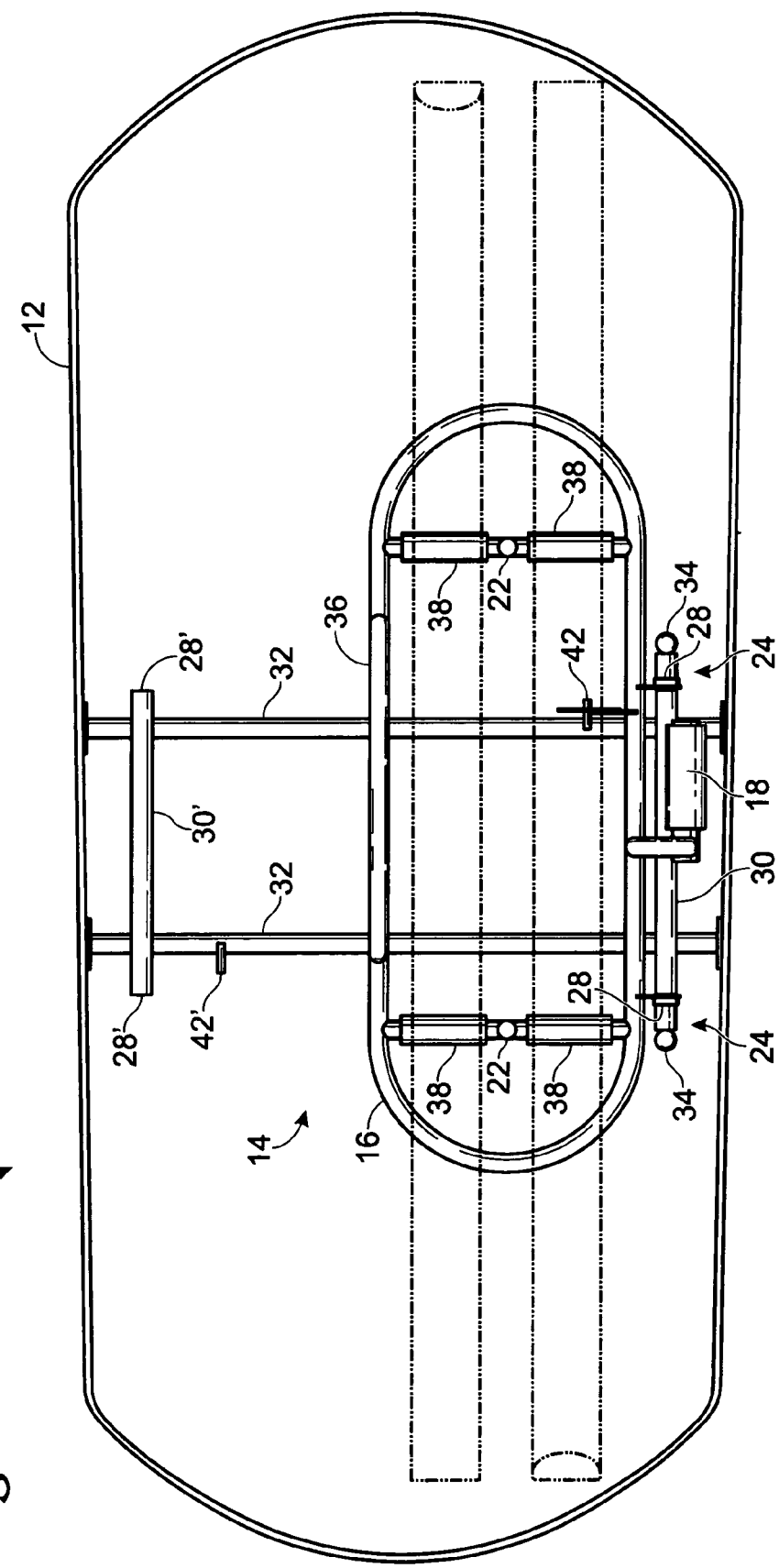
FIG. 3 is a top view of an embodiment of a cargo box with the top of the box removed, showing an attached gear mounting assembly according to aspects of the present disclosure.
Figure 4:
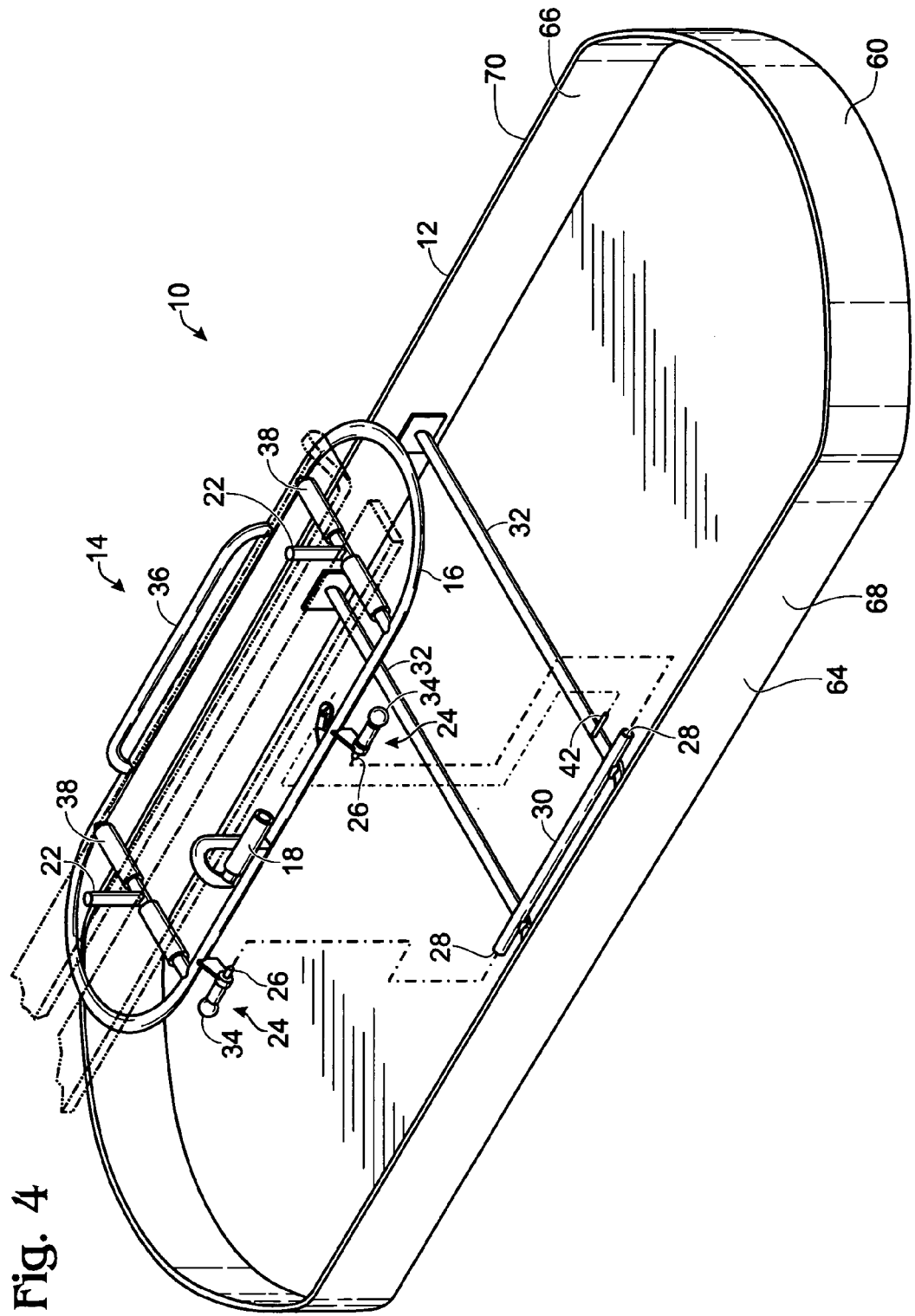
FIG. 4 is a perspective view of another embodiment of a cargo box with its top removed, depicting how a gear mounting assembly may be attached to the cargo box according to aspects of the present disclosure.

For convenience, gear mounting assembly 14 may be selectively removable from cargo box 12. FIG. 3 shows a top view of the gear mounting assembly mounted within the box, illustrating aspects of an attachment mechanism, generally indicated at 24, for attachment of support platform 16 to box 12. FIG. 4 shows a perspective view of a similar gear mounting assembly separated from the cargo box, further illustrating the attachment mechanism. Attachment mechanism 24, which as described below may be configured to allow tool free (i.e. manual) attachment of the support platform to the cargo box, may include a pair of rotatable hinge members 26 (see FIG. 4), which are connected to support platform 16 and configured to fit into a pair of complementary structures such as apertures 28 associated with box 12.

The complementary structures into which hinge members 26 fit may be apertures formed integrally with the cargo box (not shown) or, as depicted in FIGS. 3 and 4, apertures 28 may be formed in a separate connecting member 30 that is attached to the box. Connecting member 30 may be attached to the box, for example, by attaching it to a pair of cross members 32 that each are connected to opposite sides of the box, and which therefore span the box from side to side. The cross members may be connected to the box in any suitable manner, such as using bolts, screws, mounting plates, or integrated structures built into the box, among others. In other embodiments, the complementary structures into which the hinge members fit may take the form of grooves, hooks, or any other structures configured to securely retain the hinge members while allowing rotation of the support platform with respect to the cargo box.

In some embodiments, the cargo box may be provided with a second set of complementary structures for receiving the hinge members of the gear mounting assembly, and this second set of structures may be disposed on a side of the cargo box opposite the first set of complementary structures, so that the box includes two symmetrically disposed sets of structures for securing the support platform. For example, as depicted in FIG. 3, a second connecting member 30' may be provided on the side of the box opposite connecting member 30, and attached to cross members 32 in the same manner as member 30 is attached. Connecting member 30' has a pair of apertures 28' that are identical to apertures 28 in member 30, so that the gear mounting assembly may be selectively attached to either side of the cargo box. This feature is particularly useful when used in conjunction with cargo boxes that are configured to be opened from either side. In this case, providing symmetric structures into which the hinge members may fit into allows selective access to the rotated assembly from either the driver's side or the passenger side of the vehicle.

Hinge members 26 may take the form of a pair of cylindrical pins, as indicated in FIG. 4, or may take any other form allowing rotation of the support platform relative to the cargo box. In some embodiments, the hinge members may be spring-loaded, so that they are biased to move inward toward each other when released, thus facilitating their secure engagement with apertures 28. Each hinge member also may have a knob 34 attached, configured to allow a user to remove the hinge members from their associated apertures by hand. In other words, the knobs are configured to allow tool free retraction of the spring-loaded hinge members from their associated apertures.

As FIGS. 3 and 4 also show, assembly 14 also may include a handle 18, which may be used to rotate the gear mounting assembly into and out of the plane of the cargo box base. For example, as described in more detail below, the gear mounting assembly may include a spring-biased or other suitable stabilizing mechanism to stably lock the assembly either in the plane of the box base or in a rotated position. Handle 18 may include a mechanism, such as an attached strap, button or lever, to release the spring-biased lock and thus to allow assembly 14 to rotate from one position to another. Alternatively, the handle may itself be rotatable, such that rotating the handle into one position releases the locking mechanism, and rotating the handle into another position engages the locking mechanism.

As FIG. 4 also indicates, a railing 36 of the gear mounting assembly may provide the user with an additional point at which to grasp the assembly while rotating it, and may provide additional stability for various mounted items such as snowboards or other relatively large pieces of gear or equipment. The assembly also may include a plurality of mounting pads 38, configured to frictionally or otherwise engage skis, snowboards, or other equipment and to minimize both movement of the equipment on the assembly and damage to the equipment during transit. As described previously, one or more separators 22 may be disposed between the pads, and may be rotatable so that they can be used to separate pairs of skis as desired, or rotated out of the way so that assembly 14 can accommodate snowboards or other larger equipment.

FIGS. 3 and 4 also indicate a possible manner in which gear mounting assembly 14 may be disconnected from cargo box 12. As indicated, a user may pull a knob 34 to retract each spring-loaded member 26 from its associated aperture 28, at which point the assembly may be lifted out of the interior of the box. To place the assembly in the box, the user pulls knobs 34 outward, positions the assembly correctly (i.e., with spring loaded members 26 aligned with their associated apertures), and then releases the knobs. In general, placement of the gear mounting assembly within the cargo box, and its removal from the box, may be tool free for added convenience to the user.

FIGS. 5-8 show details of the structure and manner of operation of a stabilizing mechanism, generally indicated at 40, for selectively stabilizing support platform 16 in its stowed position (parallel to the base plane of the cargo box) and/or in its position substantially rotated with respect to the base plane of the cargo box. In the depicted embodiment, the stabilizing mechanism includes a mounting pin 42 (also seen in FIGS. 3 and 4), and a latch mechanism 44 configured to receive the mounting pin and to provide at least two stable positions of the mounting assembly within the box. More specifically, the latch mechanism of FIGS. 5-8 includes a slot 46 that can receive the mounting pin in a locked position, and which also allows the mounting pin to move away from the locked position.

Figure 5:
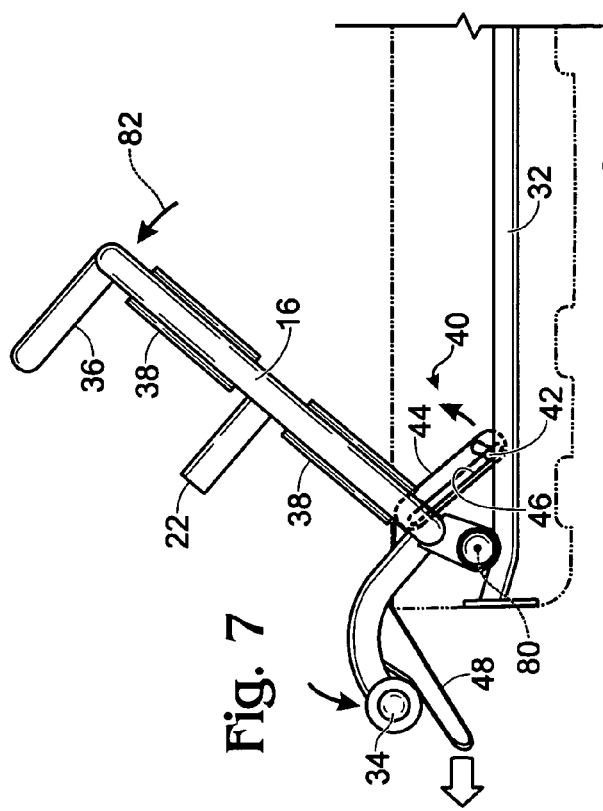
FIG. 5 is a partially cut away side sectional view of the base of a cargo box and a gear mounting assembly attached to the box, showing the gear mounting assembly in a stowed position.
Figure 6:
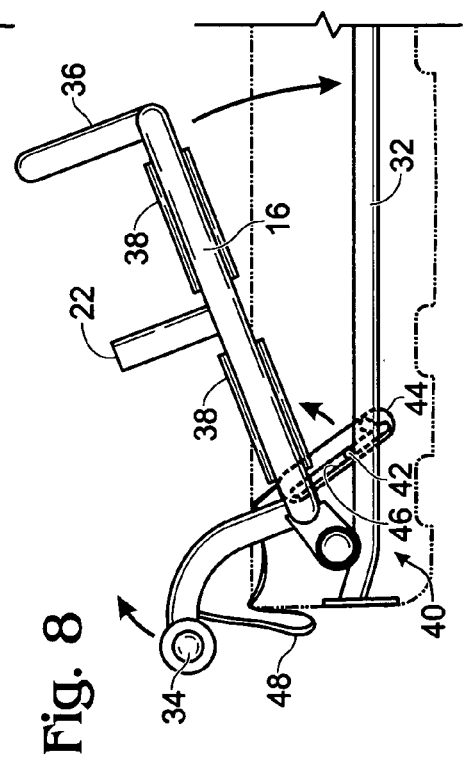
FIG. 6 is another partially cut away side sectional view of the base of a cargo box and a gear mounting assembly attached to the box, showing the gear mounting assembly in a stable, substantially rotated position.

In one embodiment, slot 46 is shaped with an acute angle that separates a relatively longer section from a relatively shorter section of the slot. When pin 42 is disposed within the longer section as depicted in FIG. 5, support platform 16 is stabilized in its stowed position. When the support platform is rotated upward, pin 42 slides along the longer section of slot 46 until it engages the shorter section of the slot, as depicted in FIG. 6. A spring (not shown) may be provided in the slot to bias motion of the pin toward the shorter section of the slot, thus assisting with upward rotation of the support platform and helping to prevent the platform from undergoing an uncontrolled downward motion.

With the pin disposed in the shorter section of the slot as in FIG. 6, the mounting pin is in a locked position, because the weight of the support platform exerts a torque that forces the pin against the end of the slot, preventing downward rotation of the platform unless a countervailing torque is applied. Thus, FIG. 6 represents the support platform in its stable, substantially rotated position, with the platform conveniently "presented" to the user for storage or removal of gear. Also as depicted in FIG. 6, retaining straps 20 may be removable and/or adjustable, to further facilitate convenient mounting of a variety of gear onto the platform.

Figure 7:
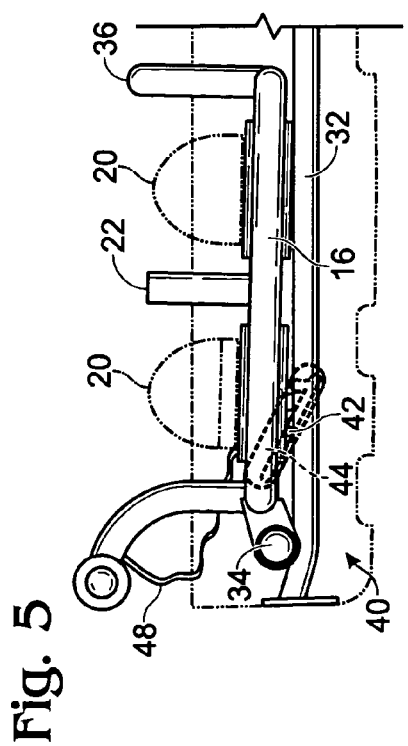
FIG. 7 is another partially cut away side sectional view of the base of a cargo box and a gear mounting assembly attached to the box, showing how the gear mounting assembly may be released from its rotated position with a release mechanism.
Figure 8:
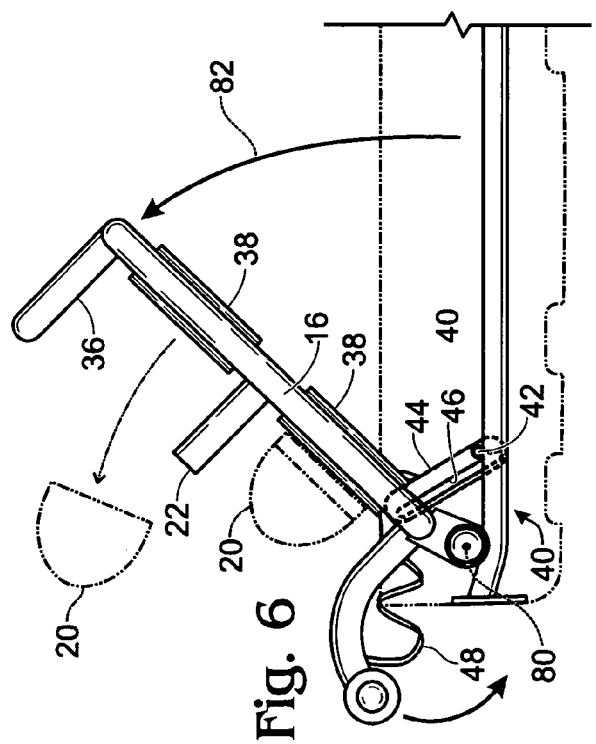
FIG. 8 is another partially cut away side sectional view of the base of a cargo box and a gear mounting assembly attached to the box, showing the gear mounting assembly in an intermediate position, moving from its stable rotated position toward its stowed position.

To disengage the support platform from its rotated position, a release mechanism may be provided to enable a user to apply the countervailing torque necessary to release to the pin from its locked position. The release mechanism may, as depicted in FIGS. 5-8, take the form of a strap 48 connected to an upper portion of the latch mechanism, so that applying tension to the strap exerts a torque upon the latch mechanism relative to the mounting pin. Thus when a user exerts tension on the strap as depicted in FIG. 7, this causes the pin to be released from its locked position. Then, as depicted in FIG. 8, the pin may be moved away from its locked position and toward the distal end of slot 46, corresponding to rotation of the gear mounting assembly away from its substantially rotated position and toward its position parallel to the base plane of the cargo box. When the mounting assembly has been allowed to fully rotate downward, it will be back in the stowed position shown in FIG. 5, and the cargo box may be closed. Optionally, the user may wish to lock the box prior to transit, to protect the equipment stored within from theft or vandalism.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

We claim:

1. A gear mounting assembly for mounting gear within a vehicle rooftop cargo box, comprising:
a support platform for mounting gear and configured to fit within a vehicle cargo box, the cargo box including a base structure having a sidewall with a circumferential upper lip;
an attachment mechanism for attaching the support platform to the cargo box, the attachment mechanism configured to allow selective rotation of the support platform between a first position in which the support platform is disposed substantially within the base structure and beneath the upper lip of the sidewall and a second position in which at least a portion of the support platform is disposed above the upper lip of the sidewall of the base structure; and
a stabilizing mechanism for selectively stabilizing the support platform in at least the second position, wherein the attachment mechanism is configured to allow tool free attachment of the support platform to the cargo box, wherein the attachment mechanism includes first and second hinge members connected to the support platform and configured to fit securely into first and second complementary apertures in the box; and
wherein each hinge member is spring-loaded.

2. The gear mounting assembly of claim 1, wherein the attachment mechanism further includes a knob attached to each spring-loaded hinge member, and wherein each knob is configured to allow tool free retraction of each spring-loaded hinge member from its associated aperture.

3. A gear mounting assembly for mounting gear within a vehicle rooftop cargo box, comprising:
a support platform for mounting gear and configured to fit within a vehicle cargo box, the cargo box including a base structure having a sidewall with a circumferential upper lip;
an attachment mechanism for attaching the support platform to the cargo box, the attachment mechanism configured to allow selective rotation of the support platform between a first position in which the support platform is disposed substantially within the base structure and beneath the upper lip of the sidewall and a second position in which at least a portion of the support platform is disposed above the upper lip of the sidewall of the base structure;
a stabilizing mechanism for selectively stabilizing the support platform in at least the second position; and
wherein the stabilizing mechanism includes a mounting pin, and a latch mechanism configured to receive the mounting pin and to provide at least two stable positions of the support platform.

4. The gear mounting assembly of claim 3, wherein the support platform is configured to mount at least two pairs of skis.

5. The gear mounting assembly of claim 3, wherein the support platform includes at least one removable retaining strap configured to retain gear mounted to the support platform.

6. The gear mounting assembly of claim 3, wherein the cargo box includes a cover structure pivotably mounted to the base structure and configured to pivot about a first axis in a first rotational direction from a closed position toward an open position, and the attachment mechanism is configured to allow selective rotation of the support platform from the first position toward the second position about a second axis spaced from the first axis in a second rotational direction opposite the first rotational direction.

7. The gear mounting assembly of claim 4, wherein the support platform includes at least one divider configured to separate the pairs of skis, and wherein the divider is further configured to be selectively flipped down so that the support platform can accommodate at least one snowboard.

8. The gear mounting assembly of claim 3, wherein the latch mechanism includes a slot configured to receive the mounting pin in a locked position and to allow the mounting pin to move away from the locked position.

9. The gear mounting assembly of claim 8, wherein the locked position of the mounting pin corresponds to the second position of the support platform, and wherein motion of the mounting pin away from the locked position corresponds to rotation of the support platform away from the second position and toward the first position.

10. The gear mounting assembly of claim 9, further comprising a release mechanism configured to selectively release the support platform from the second position by releasing the mounting pin from the locked position.

11. A rooftop cargo box system, comprising:
a cargo box including a base structure and a cover structure, wherein the base structure is configured to be mounted on a vehicle rooftop, and the cover structure is pivotably mounted to the base structure and configured to pivot about a first axis in a first rotational direction from a closed position toward an open position; and
a gear mounting assembly, including:
a support platform for mounting gear and configured to fit within the cargo box;
an attachment mechanism for attaching the support platform to the base structure, the attachment mechanism being configured to allow selective rotation of the support platform about a second axis parallel to the first axis in a second rotational direction from a first position substantially parallel to a base plane of the box toward a second position substantially rotated relative to the base plane, wherein the second rotational direction is opposite the first rotational direction; and
a stabilizing mechanism for selectively stabilizing the support platform in at least the second position;
wherein the base structure includes at least first and second apertures, and wherein the attachment mechanism includes first and second hinge members connected to the support platform and configured to fit securely into the apertures; and
wherein the hinge members are spring loaded, wherein the attachment mechanism further includes a knob attached to each spring-loaded hinge member, and wherein each knob is configured to allow tool free retraction of one of the spring-loaded hinge members from its associated aperture.

12. The cargo box system of claim 11, wherein the first and second apertures are disposed along a first side of the base structure to allow the support platform to be selectively attached to and detached from the first side of the base structure, and wherein the base structure further includes third and fourth apertures disposed along a second side of the base structure to allow the support platform to be selectively attached to and detached from the second side of the base structure.

13. A rooftop cargo box system, comprising:
a cargo box including a base structure and a cover structure, wherein the base structure is configured to be mounted on a vehicle rooftop, and the cover structure is pivotably mounted to the base structure and configured to pivot about a first axis in a first rotational direction from a closed position toward an open position; and
a gear mounting assembly, including:
a support platform for mounting gear and configured to fit within the cargo box;
an attachment mechanism for attaching the support platform to the base structure, the attachment mechanism being configured to allow selective rotation of the support platform about a second axis parallel to the first axis in a second rotational direction from a first position substantially parallel to a base plane of the box toward a second position substantially rotated relative to the base plane, wherein the second rotational direction is opposite the first rotational direction; and
a stabilizing mechanism for selectively stabilizing the support platform in at least the second position; and
wherein the stabilizing mechanism includes a mounting pin and a latch mechanism configured to receive the mounting pin and to provide at least two stable positions of the support platform.

14. The cargo box system of claim 13, wherein the latch mechanism includes a slot configured to receive the mounting pin in a locked position corresponding to the second position of the support platform, and further configured to allow the mounting pin to move away from the locked position, wherein motion of the mounting pin away from the locked position corresponds to motion of the support platform away from its second position and toward its first position.

15. The cargo box system of claim 13, wherein the base structure includes opposed first and second sidewalls, the first axis is proximate the first sidewall, and the second axis is proximate the second sidewall.

16. The cargo box system of claim 13, wherein the base structure includes a sidewall having an upper lip, in the first position at least a portion of the support platform is disposed within the base structure beneath the upper lip of the sidewall, and in the second position the portion of the support platform is disposed above the upper lip of the sidewall.

17. The gear mounting assembly of claim 6, wherein the sidewall includes first and second opposed portions, the first axis is proximate the first portion of the sidewall and proximate the upper lip, and the second axis is proximate the second portion of the sidewall.

* * * * *